United States Patent
Kondo et al.

(10) Patent No.: US 6,678,762 B2
(45) Date of Patent: Jan. 13, 2004

(54) DATA PROCESSOR AND DATA PROCESSING METHOD

(75) Inventors: Hiroyasu Kondo, Kanagawa (JP); Kenjiro Mori, Tokyo (JP)

(73) Assignee: Ando Electric Co., Ltd., Kanagawa (JP)

( * ) Notice: Subject to any disclaimer, the term of this patent is extended or adjusted under 35 U.S.C. 154(b) by 459 days.

(21) Appl. No.: 09/818,734

(22) Filed: Mar. 27, 2001

(65) Prior Publication Data

US 2001/0028661 A1 Oct. 11, 2001

(30) Foreign Application Priority Data

Mar. 31, 2000 (JP) .................................. P. 2000-098137

(51) Int. Cl.[7] .............................. G06F 13/00; H04L 7/08
(52) U.S. Cl. ............................. 710/61; 710/71; 370/513
(58) Field of Search .............................. 710/65, 66, 71, 710/30, 61, 52; 370/503, 513, 509, 474; 341/50, 100, 101

(56) References Cited

U.S. PATENT DOCUMENTS

| | | | | | |
|---|---|---|---|---|---|
| 5,835,498 A | * | 11/1998 | Kim et al. | ................... | 370/537 |
| 5,862,143 A | * | 1/1999 | Suh | ............................. | 370/513 |
| 6,385,213 B1 | * | 5/2002 | Nakamura et al. | .......... | 370/513 |
| 6,594,274 B1 | * | 7/2003 | Ohyama | ..................... | 370/450 |

* cited by examiner

*Primary Examiner*—Kim Huynh
(74) *Attorney, Agent, or Firm*—Fish & Richardson P.C.

(57) ABSTRACT

The data processor 1 converts the serial data in the STM-16 to parallel data that is based on four bytes (32 bits). The transparence data detector 20 detects the position of the data (transparence data) as a candidate for transparence processing in the parallel data and the transparence data sampling section 30 converts the transparence data based on the detected position and rearranges the processed data in each parallel data block (hereinafter referred to as a block). then, the data arrangement section 40 sequentially inserts empty byte data in each block to the preceding block to rearrange parallel data. Thus, the data processor 1 can perform transparence processing easily via a relatively low-speed general-purpose device.

8 Claims, 9 Drawing Sheets

FIG. 7

| EMPTY BYTE COUNT OF DATA C | | 0 | 1 | 2 | 3 | |
|---|---|---|---|---|---|---|
| VALID BYTE COUNT OF DATA B | | | | | ≥ 3 | 2 |
| SWITCH OUTPUT | 1 | C-1 | C-1 | C-1 | C-1 | C-1 |
| | 2 | C-2 | C-2 | C-2 | B-1 | B-1 |
| | 3 | C-3 | C-3 | B-1 | B-2 | B-2 |
| | 4 | C-4 | B-1 | B-2 | B-3 | A-1 |

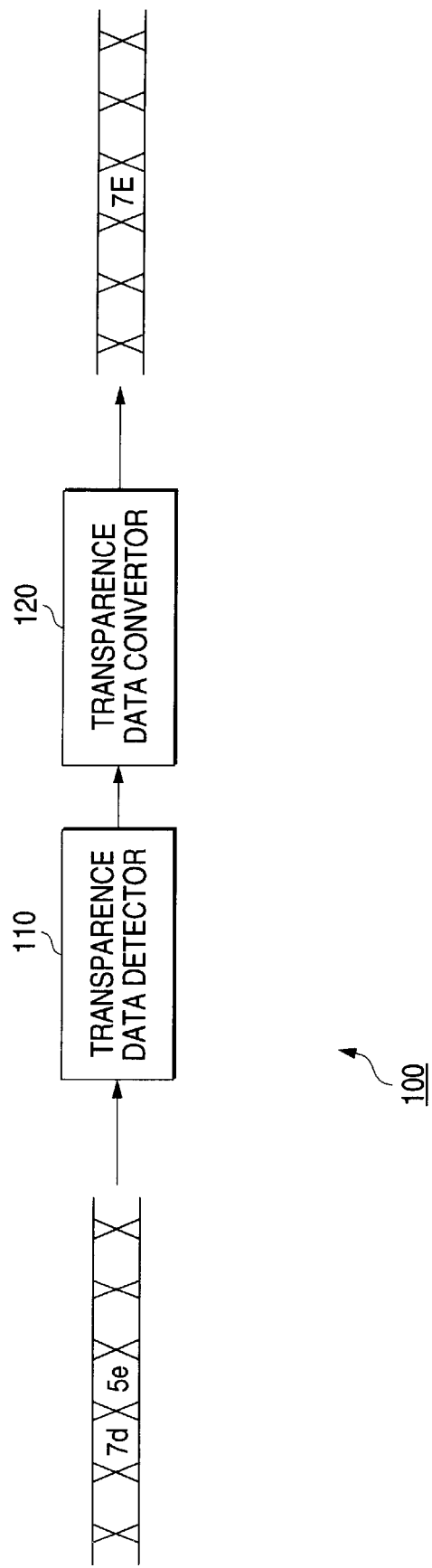

DATA PROCESSOR AND DATA PROCESSING METHOD

BACKGROUND OF THE INVENTION

1. Field of the Invention

The present invention relates to data processing apparatus and a data processing method used for high-speed serial communications.

2. Description of the Related Art

One of the global standards for realizing high-speed data communications is the SDH (Synchronous Digital Hierarchy). The SDH specifies the synchronous transfer mode called STM (Synchronous Transfer Module). The bit rate of the corresponding module STM-1 (Synchronous Transfer Module Level One) is 155.52 Mb/s.

The frame structure of the STM-1 is composed of a byte matrix of nine rows by 270 columns. The leading section of nine rows by one column is called the section overhead (hereinafter referred to as the SOH). The subsequent section of nine rows by nine columns is called the payload. The SOH is a management section having frame synchronization signals and maintenance information appended to the payload. The payload accommodates multiplexed real data.

In the STM, one frame is transmitted in 125 microseconds. Bit rate depends on the number of bytes corresponding to the data of one row by one column. For example, in the STM-1, data of one row by one column is one-byte data thus nine rows×270 bytes×(1/125 microseconds)=155.52. The bit rate is 155.52 Mbps. The SDH specifies standardized modules such as the STM-4 having a bit rate four times as large as that of the STM-1, with the data of one row by one column being four bytes, and the STM-16 having a bit rate 16 times as large as that of the STM-1, with the data of one row by one column being 16 bytes.

The STM divides one frame into a plurality of time slots (channels) and multiplexes a plurality of data pieces by storing in each time slot original data such as user data that is transmitted/received. Such multiplexed data is transmitted as serial data via the SDH transparence network.

In the data transmitted via the SDH transparence network is inserted predetermined data (idle data) in order to delimit data in the STM. In order to distinguish original data having the same code as idle data, predetermined data conversion is performed. Thus, it is necessary for the receiving party to perform transparence processing for restoring data converted by the sending party.

The transparence processing is a processing whereby received serial data is sequentially converted to parallel data every eight bits and predetermined data (transparence data) converted at the sending party is converted (restored) to original data at the receiving party of the SDH transparence network.

FIG. 9 is a schematic diagram of the transparence processing according to the related art.

In FIG. 9, received serial data is input to a transparence data detector 110 of a data processor 100. The transparence data detector detects information on the transparence data in the received data such as the position of the transparence data and sends the received data and detected information to a transparence data converter 120. The transparence data converter 120 converts the transparence data in the received data to the predetermined original data based on the detected information received.

In recent years, high-speed data communications based on the STM-16 are in use with the expansion of communication data.

In the STM-16, parallel conversion on a per eight bits basis requires processing at 311 Mbps (8-bit parallel data processing).

The processing speed of a device used for transparence processing cannot reach 311 Mbps (8-bit parallel data processing).

SUMMARY OF THE INVENTION

An object of the invention is to easily realize the transparence processing on high-speed serial data that is based on the STM.

To achieve the above object, according to a first aspect of the invention, there is provided a data processor used for high-speed serial data communications, comprising:

a data converter such as an interface (not shown) provided at the input of a data processor 1 for receiving high-speed serial data and converting the data to parallel data of predetermined data width;

a transparence data information detector (for example, a transparence information detector 20 in FIG. 1) for detecting information on transparence data from the parallel data converted by the data converter;

a transparence data converter (for example a transparence data sampling section 30 in FIG. 1) for converting transparence data in the parallel data based on the information on transparence data and moving the data toward the head address and rearranging the data within the parallel data; and a data arrangement section (for example a data arrangement section 40 in FIG. 1) for moving predetermined number of data pieces from parallel data in the subsequent parallel data to the rearranged parallel data in the transparence data converter and rearranging the data into parallel data of predetermined data width.

According to the first aspect of the invention, in the data processor used for high-speed serial data communications, the data converter receives high-speed serial data and converts the data to parallel data of predetermined data width, the transparence data converter converts transparence data in the parallel data based on information on the transparence data and moves the data toward the head address and rearranges the data within the parallel data, and a data arrangement section moves predetermined number of data pieces from parallel data in the subsequent parallel data to the rearranged parallel data in the transparence data converter and rearranges the data into parallel data of predetermined data width.

According to a fifth aspect of the invention, there is provided a data processing method for data associated with high-speed serial communications, said method comprising:

a first step for receiving high-speed serial data and converting the data to parallel data of predetermined data width;

a second step for detecting information on transparence data from the parallel data converted by the data converter;

a third step for converting transparence data in the parallel data based on information on the transparence data and moving the data toward the head address and rearranging the data within the parallel data; and a fourth step for moving predetermined number of data pieces from parallel data in the subsequent parallel data to the rearranged parallel data and rearranging the data into parallel data of predetermined data width.

Thus, received serial data can be converted to parallel data and processed based on the detected transparence data information according to the first and fifth aspects of the invention. This allows high-speed serial data to be applied transparence processing via a relatively low-speed device. It is possible to flexibly support serial data of a variety of data speeds by changing as required the data width of parallel data to be converted depending on the speed of the received serial data.

The transparence data information detector, transparence data converter and data arrangement section can implement their features via relatively simple circuits. This allows scale-down of the overall apparatus and reduction in costs.

According to a second aspect of the invention, there is provided a data processor according to the first aspect of the invention, in which the transparence data information detector comprises:

a storage section for storing parallel data input from the data converter (for example F/F 21 in FIG. 1);

wherein the transparence data information detector detects information on transparence data concerning the data at the tail address of the stored parallel data and the head address of the subsequent parallel data to be input.

According to the second aspect of the invention, in a data processor according to the first aspect of the invention, a storage section stores parallel data input from the data converter and the transparence data information detector detects information on transparence data concerning the data at the tail address of the stored parallel data and the head address of the subsequent parallel data to be input.

According to a sixth aspect of the invention, there is provided a data processing method according to the fifth aspect of the invention, wherein the second step comprises: a step for storing the input parallel data and detects information on transparence data concerning the data at the tail address of the stored parallel data and the head address of the subsequent parallel data.

Thus, according to the second and sixth aspects of the invention, transparence data information can be detected even when transparence data is split into two pieces of parallel data in case received serial data is converted to parallel data, thus allowing transparence processing.

As in the third aspect of the invention, in a data processor according to the first aspect of the invention, it is possible to calculate the valid byte count indicating the valid number of data pieces contained in each piece of parallel data obtained by converting transparence data.

According to a seventh aspect of the invention, there is provided a processing method according to the fifth aspect of the invention, wherein the third step comprising: a step for calculating the valid byte count indicating the number of valid data pieces contained in each piece of parallel data obtained by converting transparence data.

Thus, according to the third and seventh aspects of the invention, the number of valid data pieces contained in each piece of parallel data is obtained by converting transparence data. This allows the data width of each piece of parallel data to be grasped easily.

As in the fourth aspect of the invention, in a data processor according to the third aspect of the invention, the data arrangement section may calculate the number of data pieces to be moved from the parallel data in the subsequent stage based on the valid byte count.

According to an eighth aspect of the invention, there is provided a data processing method according to the seventh aspect of the invention, wherein the fourth step includes a step for calculating the number of data pieces to be moved from the parallel data in the subsequent stage based on the valid byte count.

Thus, according to the fourth and eighth aspects of the invention, it is possible to easily rearrange parallel data containing empty data into parallel data of predetermined width by converting transparence data.

BRIEF DESCRIPTION OF THE DRAWINGS

FIG. 7 shows the relationship between the empty byte count of data C and valid byte count of data B and parallel data output by the selector.

FIG. 9 is a schematic diagram of the transparence processing according to the related art.

DETAILED DESCRIPTION OF THE PREFERRED EMBODIMENTS

Figure 1:
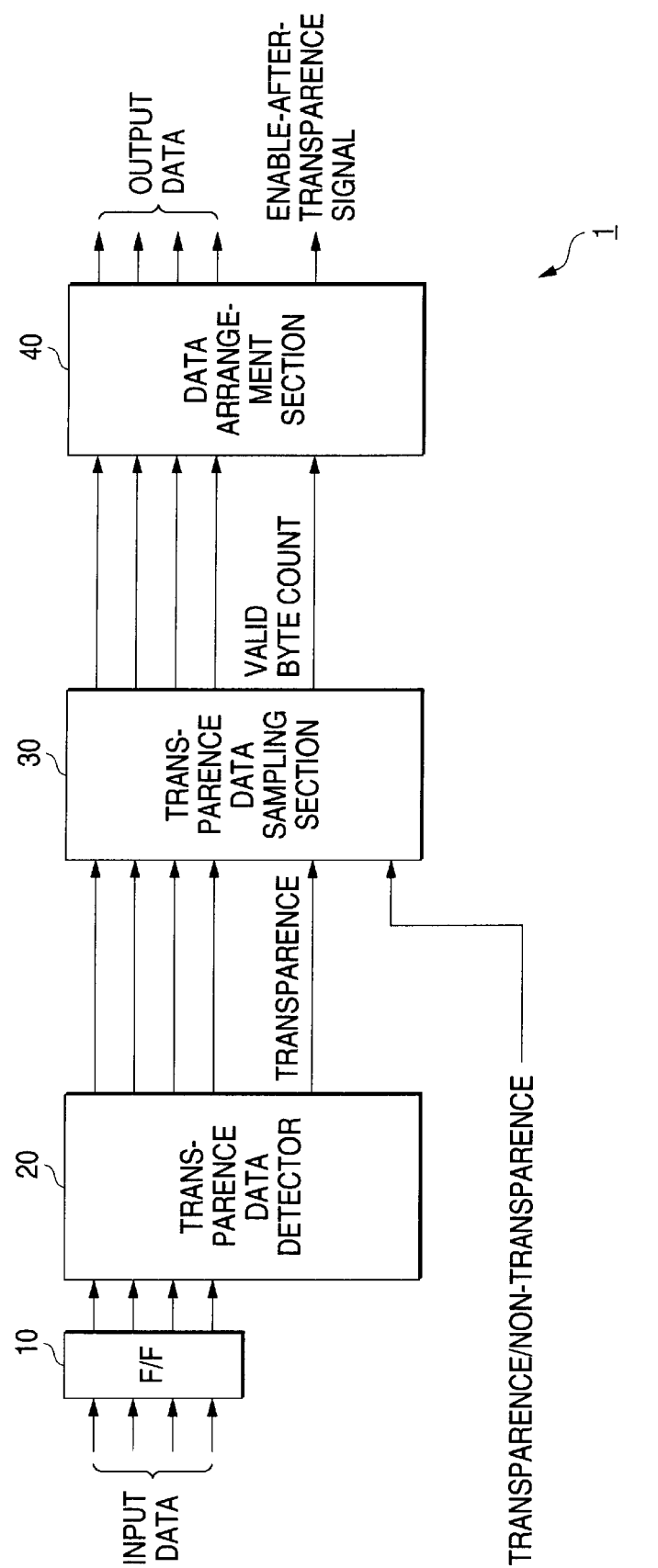
FIG. 1 is a schematic diagram showing the internal configuration of the data processor 1 to which the invention is applied.

An embodiment of the invention will be detailed with reference to drawings.

FIGS. 1 to 8 show an embodiment of the data processor 1 to which the invention is applied.

The data processor 1 converts the serial data in the STM-16 to parallel data that is based on four bytes (32 bits). The transparence data detector 20 detects the position of the data (transparence data) as a candidate for transparence processing in the parallel data and the transparence data sampling section 30 converts the transparence data based on the detected position and rearranges the processed data in each parallel data block (hereinafter referred to as a block). Then, the data arrangement section 40 sequentially inserts empty byte data in each block to the preceding block to rearrange parallel data. Thus, the data processor 1 can perform transparence processing easily via a relatively low-speed general-purpose device, by converting high-speed serial data in the STM-16 to every 4-byte parallel data for further processing.

First, the configuration of the embodiment will be described.

FIG. 1 is a schematic diagram showing the internal configuration of the data processor 1 to which the invention is applied. In FIG. 1, the data processor 1 is composed of a flip-flop (hereinafter referred to as F/F) 10, a transparence data detector 20, a transparence data sampling section 30, and a data arrangement section 40. The data processor 1 is equipped with an interface (I/F) (not shown) at its input and extracts data other than the idle data from the received serial data, converts the data to 4-byte parallel data, and outputs the parallel data to the transparence data detector 20.

The F/F 10 latches the parallel data input from the I/F and outputs the parallel data to the transparence data detector 20 with a predetermined timing.

The transparence data detector 20 detects transparence data from parallel data sent from the I/F. In this practice, the transparence data detector 30 detects transparence data from adjacent 2-byte data in a single block of the parallel data as well as latches the subsequent block and also detects transparence data from a combination of the tail address data in the preceding block and the head address data in the subsequent block.

The transparence data detector 20 sends the position information on transparence data (in which byte of which block the transparence data is positioned) together with the input parallel data to the transparence data sampling section 30. Transparence data refers to data converted to predetermined data at the sending party in order to distinguish original data having the same code as idle data from idle data.

The configuration of the transparence data detector 20 will be described.

Figure 2:
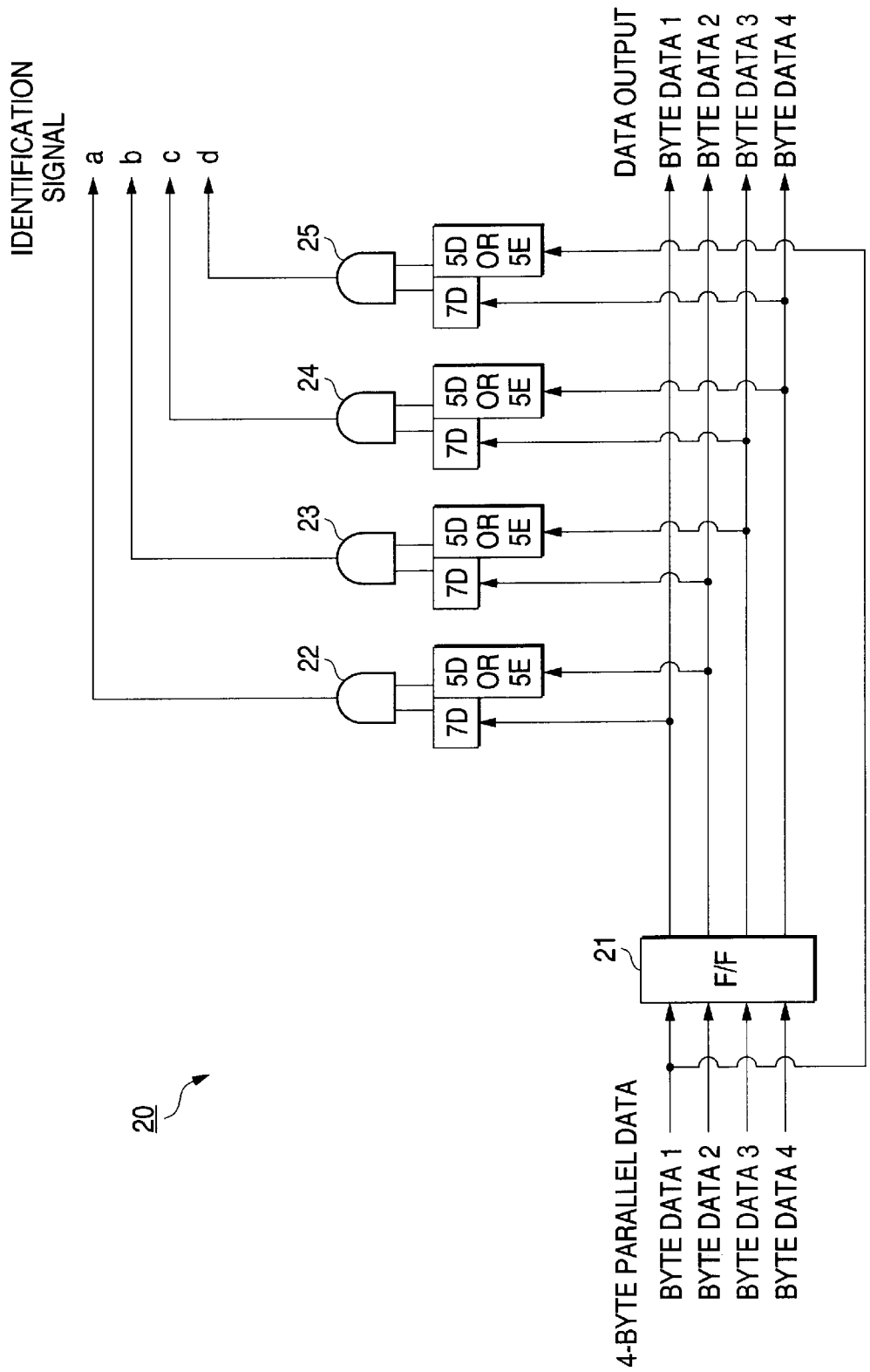
FIG. 2 shows an example of internal configuration of the transparence data detector 20.

FIG. 2 shows an example of internal configuration of the transparence data detector 20. In FIG. 2, the transparence data detector 20 comprises an F/F 21 and AND gates 22 through 25. The F/F 21 latches blocks sent from the I/F and outputs each piece of data in a block (hereinafter referred to as byte data 1 through 4, respectively) to each of the predetermined ANT gate 22 through 25.

In case transparence data is present in the block input from the F/F 21, the AND gates 22 through 25 outputs identification signals a through d (position information) for indicating the position of transparence data to the transparence data sampling section 30.

That is, byte data 1 and byte data 2 are input to the AND gate 22. In case the byte data 1 is "7d" and the byte data 2 is "5d" or "5e", the identification signal a is output. Similarly, byte data 2 and byte data 3 are input to the AND gate 23, and byte data 3 and byte data 4 to the AND gate 24. In case input data at the preceding address (byte data having a small number assigned) is "7d" and the subsequent address data (byte data having a small number assigned) is "5d" or "5e", an identification signal b or c is output. Byte data 4 and byte data 1 are input to the AND gate 25. In case the byte data 4 is "7d" and the subsequent byte data 1 is "5d" or "5e", an identification signal d is output.

The transparence data sampling section 30 converts transparence data in each block to original data based on the position information on transparence data input from the transparence data detector 20. The transparence data sampling section 30 moves the data decreased by conversion of transparence data in each block toward the head address to rearrange the data. The transparence data sampling section 30 detects the number of data pieces in a block after conversion of transparence data (hereinafter referred to as the valid byte count). The transparence data sampling section 30 outputs the rearranged block and the efficient byte count of the block to the data arrangement section 40. A transparence/non-transparence signal for indicating whether to perform transparence processing from the controller (not shown) is input to the transparence data detector 20. Via this signal, operation of the transparence data detector 20 is controlled.

Configuration of the transparence data sampling section 30 will be described.

Figure 3:
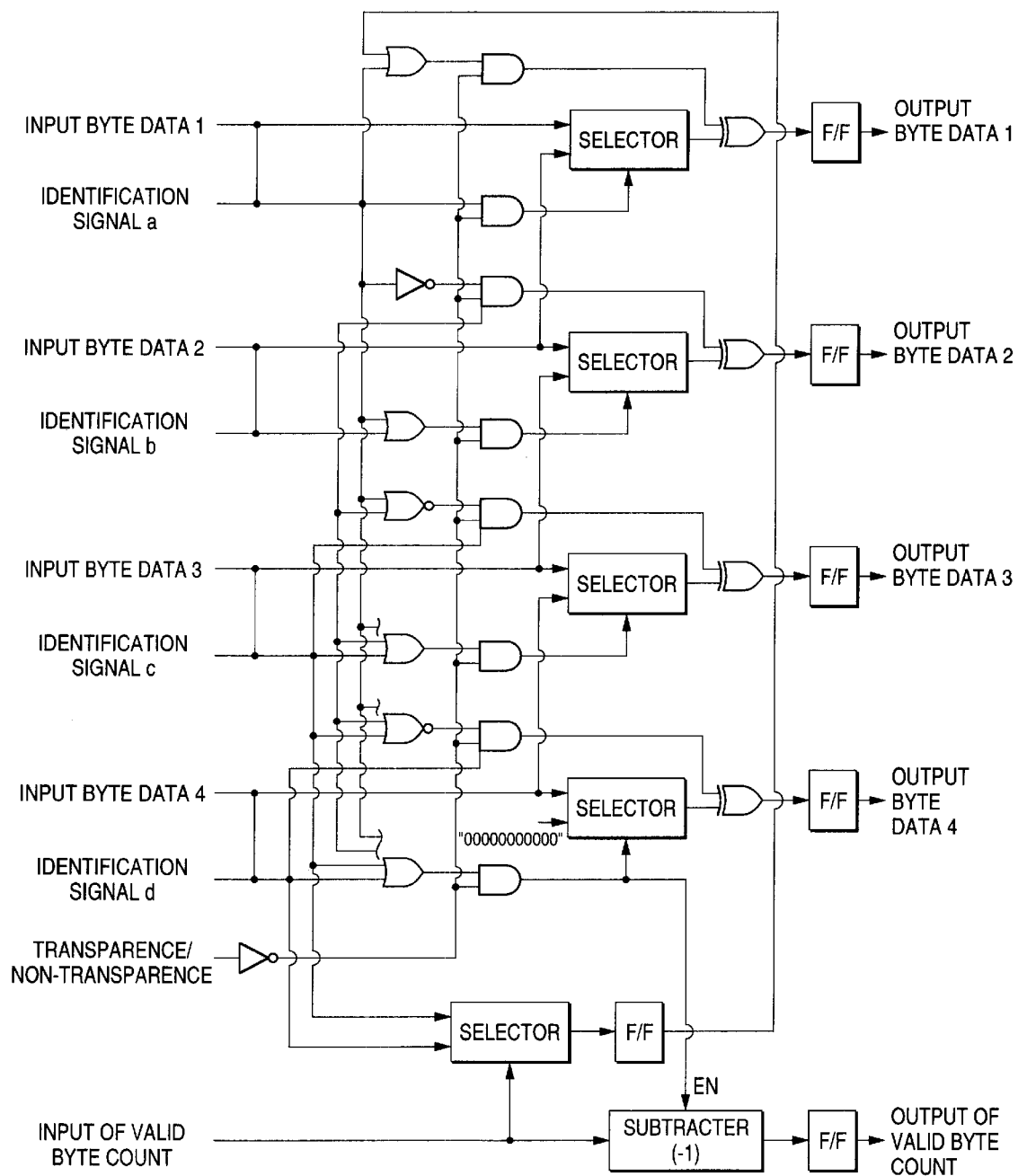
FIG. 3 shows an example of internal circuit of the transparence data sampling section 30.

FIG. 3 shows an example of internal circuit of the transparence data sampling section 30. In the circuit shown in FIG. 3, byte data 1 through 4 input from the transparence data detector 20, identification signals a through d showing whether the byte data is transparence data or not, and a transparence/non-transparence signal for controlling the transparence data sampling section 30 are input to the transparence data sampling section 30. In case transparence processing is instructed by the transparence/non-transparence signal and the identification signal indicates that the byte data is transparence data, a piece of transparence data is converted by the circuit shown in FIG. 3 and the data in the block is moved toward the head address. One block is composed of 4-byte data and a maximum of two pieces of transparence data can exist. As a result, the transparence data sampling section 30 is composed by serially connecting the circuit shown in FIG. 3 in two stages.

The data arrangement section 40 moves data from the subsequent block to the block input from the transparence data sampling section 30 based on the input valid byte count and rearranges each block into 4-byte parallel data. In this practice, an empty block is generated by moving the data. The block is treated as an invalid block and the corresponding processing is skipped, followed by processing on the subsequent block.

Configuration of the data arrangement section 40 will be described.

Figure 4:
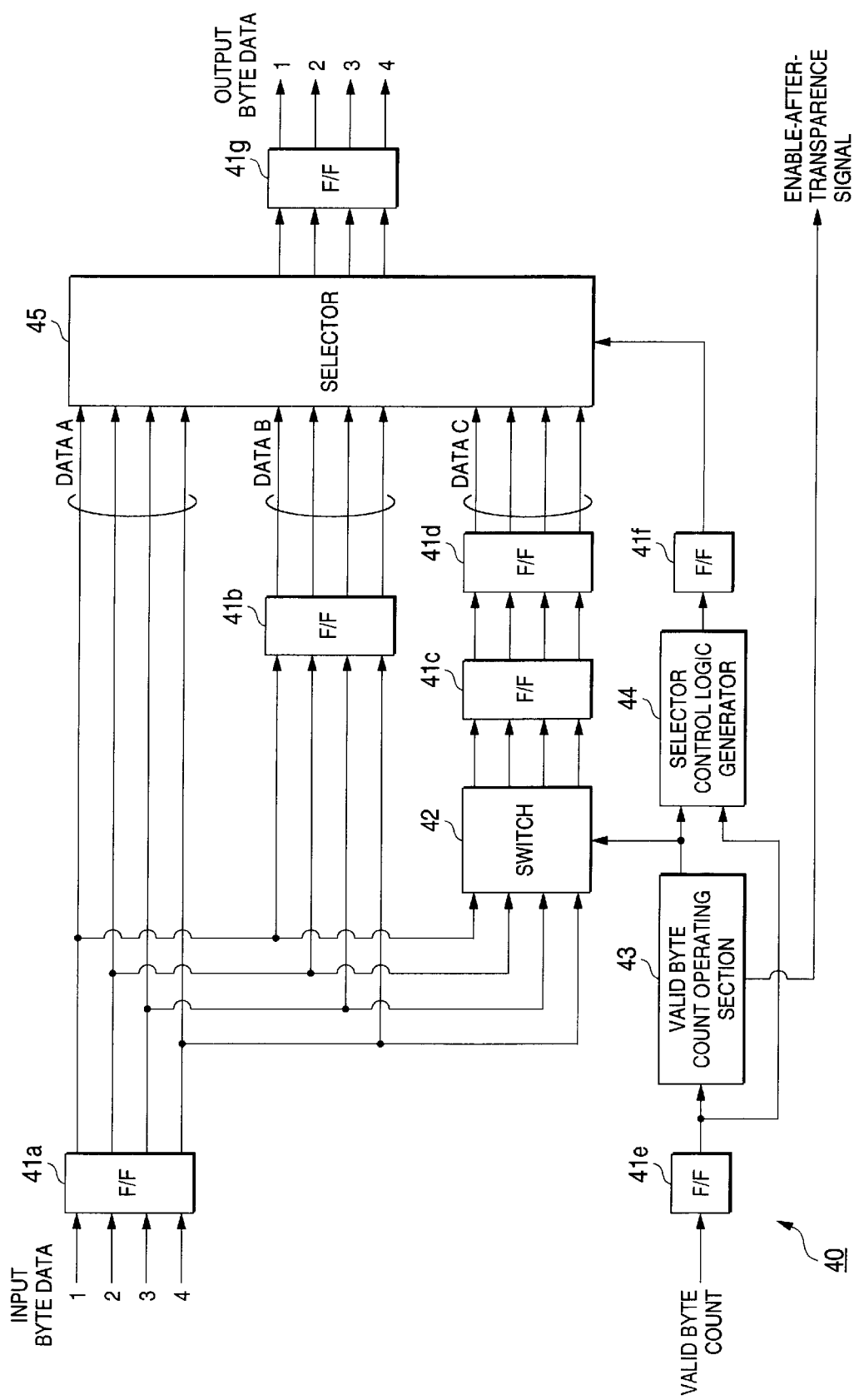
FIG. 4 shows an example of internal configuration of the data arrangement section 40.

FIG. 4 shows an example of internal configuration of the data arrangement section 40. In FIG. 4, the data arrangement section 40 comprises F/Fs 41a through 41g, a switch 42, an valid byte count operating section 43, a selector control logic generator 44, and a selector 45.

Figure 8:
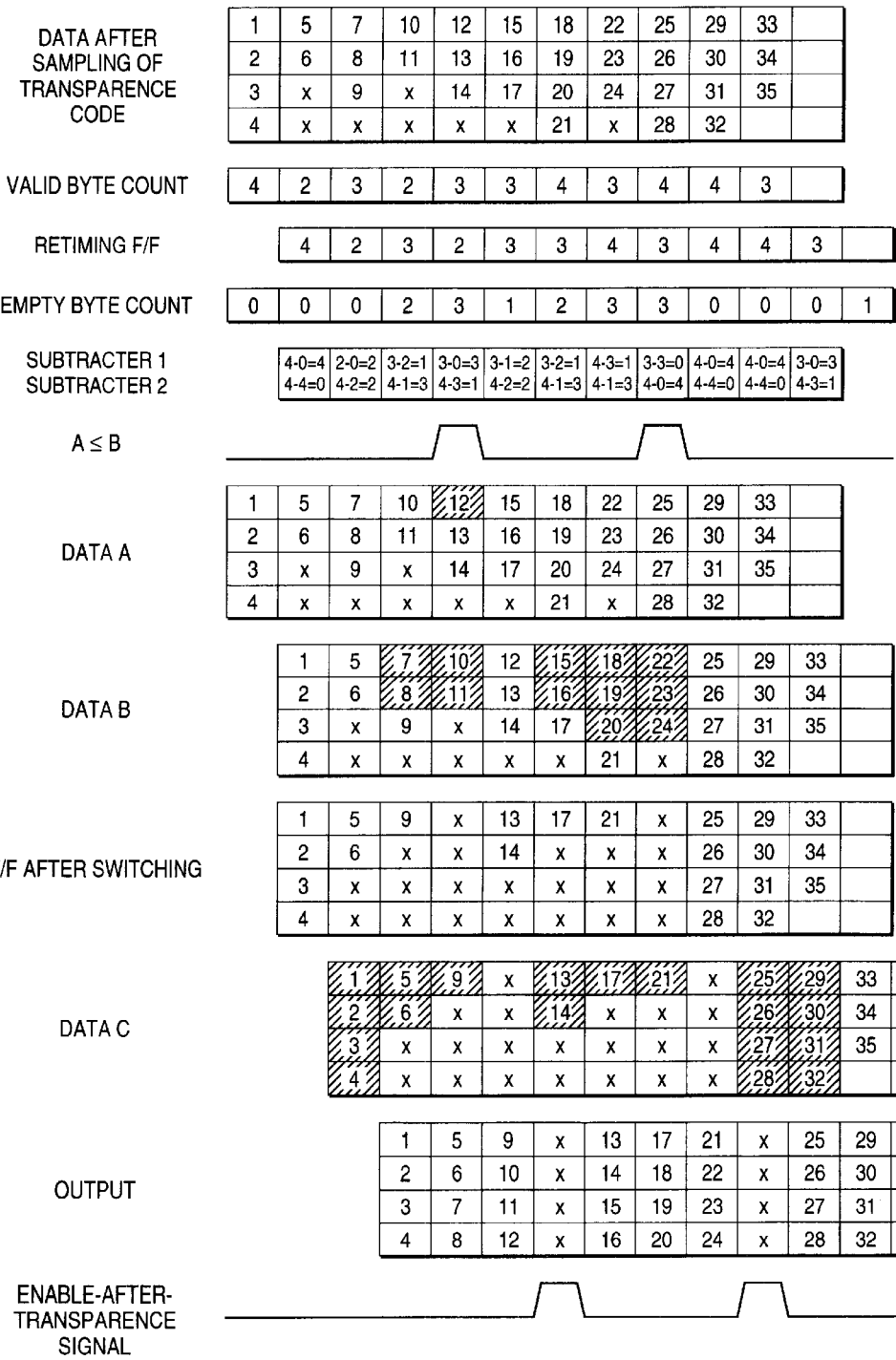
FIG. 8 shows output data and output signal from the sections in the data arrangement section 40.

FIG. 8 shows output data and output signal from the sections in the data arrangement section 40. Items marked with "X" in each block in FIG. 8 indicate empty byte data.

The F/F 41a latches the block input from the transparence data sampling section 30 and outputs the block to the F/F 41b, the switch 42 and the selector 45 (hereinafter the data latched by the F/F 41a is referred to as data A).

The F/F 41b latches the block input from the F/F 41a and outputs the block to the selector 45 (hereinafter the data latched by the F/F 41b is referred to as data B).

The F/F 41c latches the block input from the switch 42 and outputs the block to the F/F 41d. The data latched by the F/F 41c is data B moved by the switch 42.

The F/F 41d latches the block input from the F/F 41c and outputs the block to the selector 45 (hereinafter the data latched by the F/F 41d is referred to as data C).

The F/F 41e latches valid byte count input from the transparence data sampling section 30 and outputs the valid byte count to the valid byte count operating section 43 with a predetermined timing.

The F/F 41f latches the selector control signal input from the selector control logic generator 44 and outputs the signal to the selector 45. The selector control signal indicates byte data to be selected by the selector 45 out of data A through C input to the selector 45 as an output signal.

The switch 42 moves each piece of byte data of a block input from the F/F 41a toward the head address of the block, according to the "empty byte count" (described later) of the preceding block input from the valid byte count operating section 43.

Configuration of the switch 42 will be described.

Figure 5:
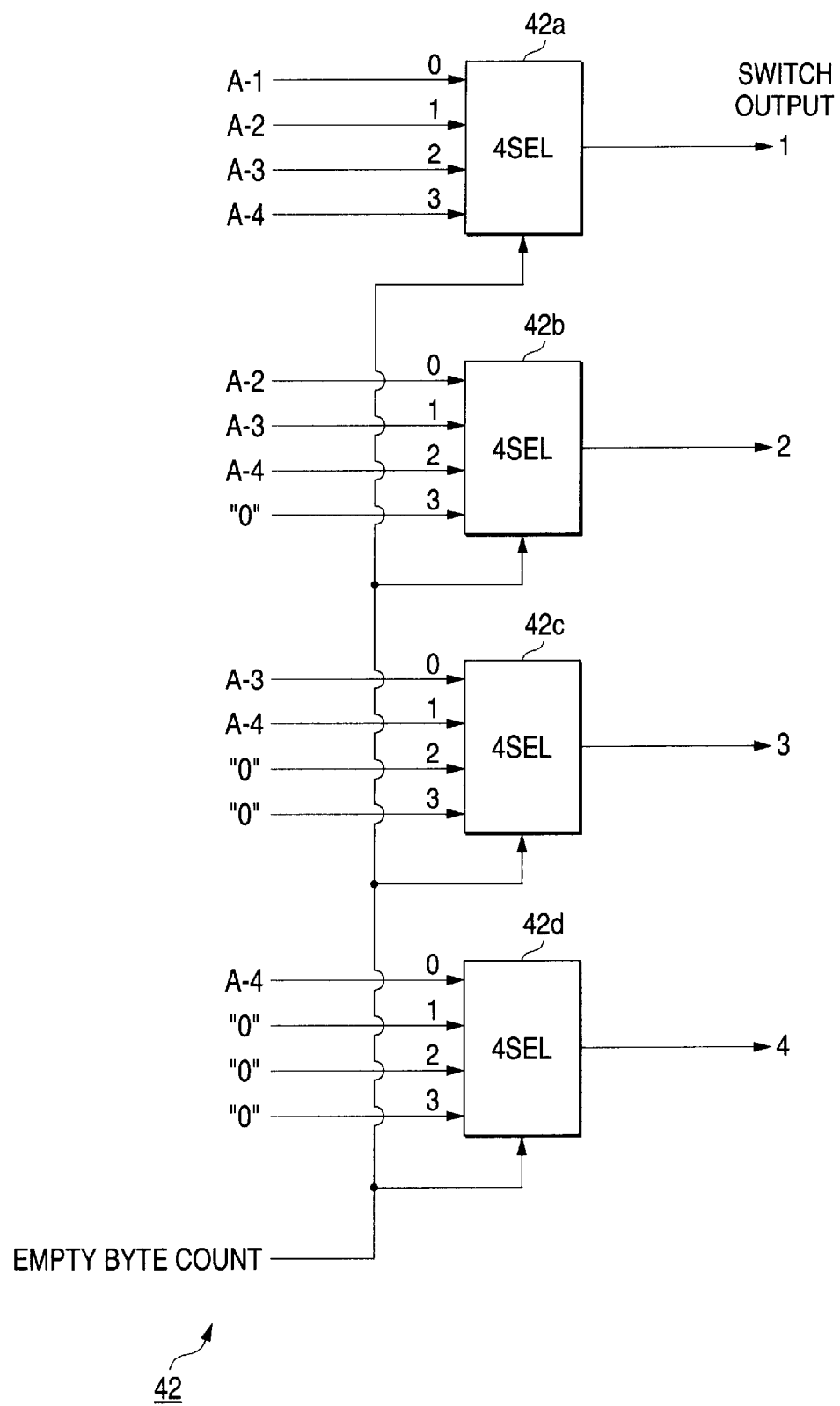
FIG. 5 shows an example of internal configuration of the switch 42.

FIG. 5 shows an example of internal configuration of the switch 42. In FIG. 5, the switch 42 comprises 4-selectors 42a through 42d.

Predetermined data selected out of data 1 through 4 (hereinafter referred to as data A-1 through data A-4 as required) and "0" indicating empty byte data is input from the F/F 41a to the 4-selectors 42a through 42d. The "empty byte count" of the preceding block is input from the valid byte count operating section 43 mentioned later. The "empty byte count" indicates the number of empty byte data pieces generated by moving byte data to the preceding block when each block is rearranged into four-byte parallel data in the data arrangement section 40.

Each 4-selector selects and outputs predetermined data from among four input signals shown in FIG. 4 according to the input empty byte counts "0" through "3". Output signals from these 4-selectors (hereinafter referred to as switch outputs) 1 through 4 has a structure: data A-1 through A-4 input to the switch 42 is moved toward the head address by the size of the empty byte count of the preceding block and a sequence of "0" is inserted at the tail address that has now empty byte data.

The valid byte count operating section 43 calculates the "empty byte count" and "enable-after-transparence signal" based on the valid byte count input from the transparence data sampling section 30. The "empty byte count" is calculated by subtracting the empty byte count of the preceding block from the valid byte count of a block currently input to the switch 42 and subtracting the calculated subtraction results from the data width of one block (four bytes). The "enable-after-transparence signal" is output in order to indicate that the block currently input to the switch 42 is an invalid block in case the block has become all "0" thus an empty block after data in the block was moved.

Configuration of the valid byte count operating section 43 will be described.

Figure 6:
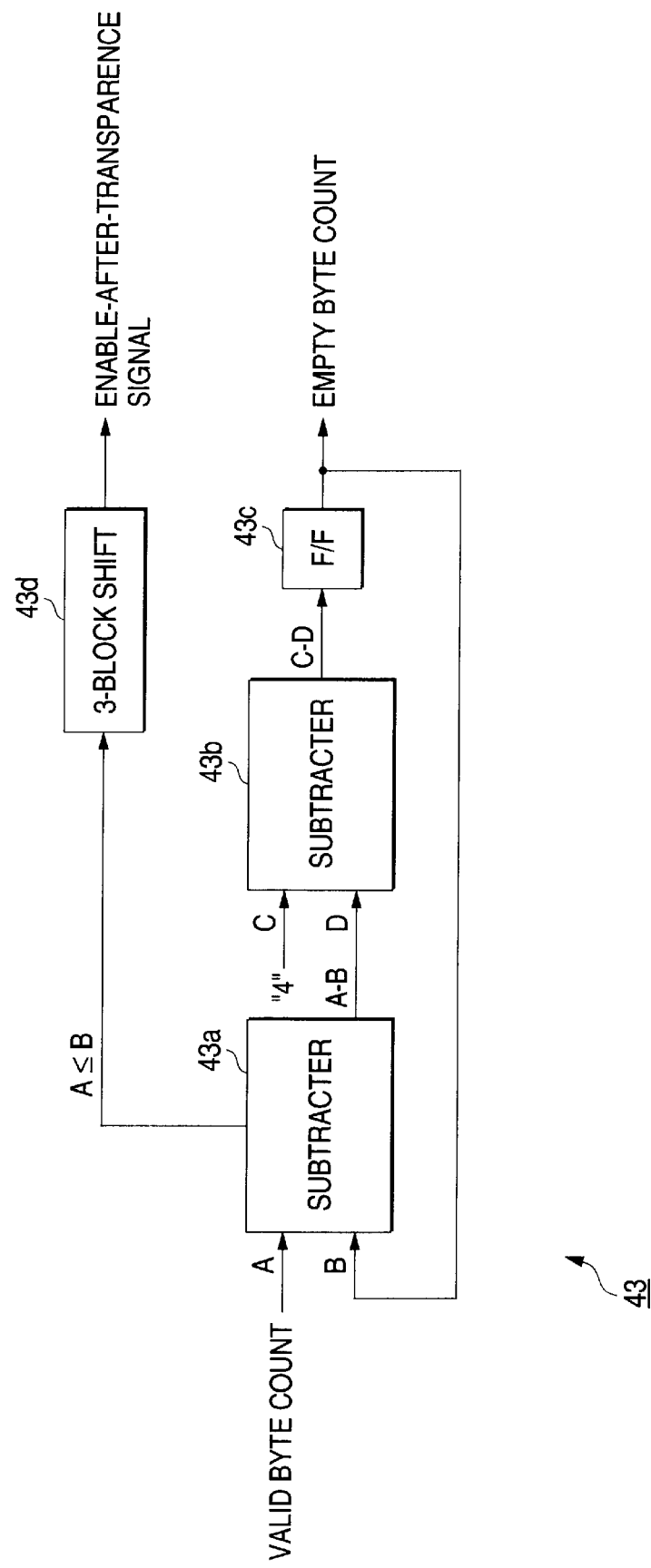
FIG. 6 shows an example of internal configuration of the valid byte count operating section 43.

FIG. 6 shows an example of internal configuration of the valid byte count operating section 43. In FIG. 6, the valid byte count operating section 43 comprises subtracters 43a, 43b, an F/F 43c, and a 3-block shift 43d.

The subtracter 43a subtracts the empty byte count of the preceding block (signal "B" in FIG. 6) from the valid byte count of the block (signal "A" in FIG. 6) input from the transparence data sampling section 30, and outputs the subtraction results to the subtracter 43b. In case the subtraction results (A−B) equal 0 or less, the subtracter 43a outputs an identification signal to the 3-block shift 43d. In this case, the block currently input to the switch 42 becomes an empty block after data has been moved and processed as invalid data.

The subtracter 43b subtracts the subtraction results (signal "D" in FIG. 6) input from the subtracter 43a from the one block byte count "4" that is constantly input (signal "C" in FIG. 6), and outputs the subtraction results to the F/F 43c.

The F/F 43c latches the subtraction results input from the subtracter 43b and outputs the subtraction results as a "switch byte count" to the switch 42 and the selector control logic generator 44 as well as the subtracter 43a.

The 3-block shift 43d shifts, by a predetermined time period, the timing of the identification signal input from the subtracter 43, and outputs the resulting signal as an enable-after-transparence signal. That is, the 3-block shift 43d outputs an enable-after-transparence signal that indicates an invalid block with the same timing as an empty block is output from the data arrangement section 40.

Next, the selector control logic generator 44 generates a selector control signal based on the valid byte count of predetermined data (data B) input from the F/F 41e and the empty byte count of data in the preceding stage (data C) input from the valid byte count operating section 43. The selector control signal indicates data to be selected as byte data when parallel data is rearranged for data C out of byte data A through C input from F/Fs 41a, 41b, 41d.

The selector 45 selects byte data to be output as rearranged parallel data out of byte data A through C input from F/Fs 41a, 41b, 41d, based on the selector control signal input from the F/F 41f, then outputs the selected data as 4-byte parallel data to the F/F 41g.

Here, relationship between data A through C input to the selector 45 and byte data in parallel form output by the selector 45 will be described. FIG. 7 shows the relationship between the empty byte count of data C and valid byte count of data B and parallel data output by the selector.

In FIG. 7, in case the empty byte count of data C is "0", it is not necessary to move byte data from data B, thus the output of the selector is byte data C-1 through C-4 of data C. In case the empty byte count of data C is 1 or 2, data B contains at least 2-byte data so that the byte data is moved as required and appended to the byte data of data C to generate 4-byte parallel data.

In case the empty byte count of data C is 3, provided the valid byte count of data B is 3 or above, the byte data of data B is moved as required and appended to the byte data of data C to generate 4-byte parallel data, same as the case where the empty byte count of data C is 1 or 2. On the other hand, in case the empty byte count of data C is 3 and the valid byte count of data B is 2, appending all the byte data of data B to the byte data of data C does not constitute 4-byte data. Thus, one byte of the subsequent data A is moved and appended to the byte data of data C to generate 4-byte parallel data.

Next, the operation of the embodiment will be described.

The data processor 1, on receiving data that is based on the STM, extracts data other than idle data in the I/F (not shown) and converts the data to 4-byte parallel data.

Then, the transparence data detector 20 detects in which byte of which block of the converted parallel data the transparence data is positioned (position information) and sends the position information and input parallel data to the transparence data sampling section 30.

Next, the transparence data sampling section 30 converts the transparence data in one block to original data based on the input position information. The transparence data sampling section 30 then rearranges the parallel data by moving the data in the block whose data count has been decreased by the conversion toward the head address, as well as detects the valid byte count of the block and outputs the rearranged block and the valid byte count to the data arrangement section 40.

Next, the data arrangement section 40 moves data from the subsequent block to the block input from the transparence data sampling section 30 based on the input valid byte count and rearranges each block into 4-byte parallel data (see FIG. 8). The empty block generated in the meantime is not processed and processing on the subsequent block follows.

Via such processing, the parallel data output from the data rearrangement section 40 has all transparence data converted and restored to original data.

As mentioned earlier, the data processor 1 according to this embodiment converts high-speed serial data in the STM-16 to every 4-byte parallel data for transparence processing.

Thus, transparence data in the received data can be easily converted to original data (transparence processing) via a relatively low-speed general-purpose device. It is possible to flexibly support a variety of data speeds by changing as required the data width of parallel data depending on the speed of the received serial data.

The data processor 1 can configure a transparence data detector 20, a transparence sampling section 30 and a data arrangement section 40 via a relatively simple circuit.

It is thus possible to scale down the overall size of the data processor 1 and reduce related costs.

As was described above, received serial data can be converted to parallel data and processed based on the detected transparence data information according to the first and fifth aspects of the invention. This allows high-speed serial data to be applied transparence processing via a relatively low-speed device. It is possible to flexibly support serial data of a variety of data speeds by changing as required the data width of parallel data to be converted depending on the speed of the received serial data. The transparence data information detector, transparence data converter and data arrangement section can implement their features via relatively simple circuits. This allows scale-down of the overall apparatus and reduction in costs.

According to the second and sixth aspects of the invention, transparence data information can be detected even when transparence data is split into two pieces of parallel data in case received serial data is converted to parallel data, thus allowing transparence processing.

According to the third and seventh aspects of the invention, the number of valid data pieces contained in each piece of parallel data is obtained by converting transparence data. This allows the data width of each piece of parallel data to be grasped easily.

According to the fourth and eighth aspects of the invention, it is possible to easily rearrange parallel data containing empty data into parallel data of predetermined width by converting transparence data.

What is claimed is:

1. A data processor used for high-speed serial data communications, comprising:

a data converter for receiving high-speed serial data and converting the data to parallel data of predetermined data width;

a transparence data information detector for detecting information on transparence data from the parallel data converted by said data converter;

a transparence data converter for converting transparence data in said parallel data based on said information on transparence data and moving the data toward the head address and rearranging the data within the parallel data; and a data arrangement section for moving predetermined number of data pieces from parallel data in the subsequent parallel data to the rearranged parallel data in said transparence data converter and rearranging the data into parallel data of predetermined data width.

2. A data processor according to claim 1, wherein said transparence data information detector comprises:

a storage section for storing parallel data input from said data converter; and wherein said transparence data information detector detects information on transparence data concerning the data at the tail address of the stored parallel data and the head address of the subsequent parallel data to be input.

3. A data processor according to claim 1, wherein said data processor calculates a valid byte count indicating the valid number of data pieces contained in each piece of parallel data obtained by converting transparence data.

4. A data processor according to claim 3, wherein said data arrangement section calculates the number of data pieces to be moved from the parallel data in the subsequent stage based on said valid byte count.

5. A data processing method for data associated with high-speed serial communications, wherein said data processing method comprises:

a first step for receiving high-speed serial data and converting the data to parallel data of predetermined data width;

a second step for detecting information on transparence data from the parallel data converted by the data converter;

a third step for converting transparence data in said parallel data based on information on said transparence data and moving the data toward the head address and rearranging the data within the parallel data; and a fourth step for moving predetermined number of data pieces from parallel data in the subsequent parallel data to said rearranged parallel data and rearranging the data into parallel data of predetermined data width.

6. A data processing method according claim 5, wherein said second step comprises a step for storing said input parallel data and detects information on transparence data concerning the data at the tail address of the stored parallel data and the head address of the subsequent parallel data.

7. A data processing method according to claim 5, wherein said third step comprises a step for calculating a valid byte count indicating the number of valid data pieces contained in each piece of parallel data obtained by converting transparence data.

8. A data processing method according to claim 7, wherein said fourth step includes a step for calculating the number of data pieces to be moved from the parallel data in the subsequent stage based on said valid byte count.

* * * * *